United States Patent
Falaki

(10) Patent No.: US 7,558,532 B2
(45) Date of Patent: Jul. 7, 2009

(54) MEASUREMENT TECHNIQUE FOR A RADIO ACCESS TELECOMMUNICATIONS TERMINAL

(75) Inventor: Hamid Falaki, Reading (GB)

(73) Assignee: NEC Corporation, Tokyo (JP)

( * ) Notice: Subject to any disclaimer, the term of this patent is extended or adjusted under 35 U.S.C. 154(b) by 1125 days.

(21) Appl. No.: 10/454,549

(22) Filed: Jun. 5, 2003

(65) Prior Publication Data

US 2003/0228890 A1    Dec. 11, 2003

(30) Foreign Application Priority Data

Jun. 6, 2002    (GB)    ................................. 0212987.2

(51) Int. Cl.
*H04B 1/00*    (2006.01)
(52) U.S. Cl. ................. 455/63.1; 455/67.11; 455/67.13; 455/343.4; 455/574
(58) Field of Classification Search ................. 455/574, 455/517, 434, 63.1, 63.3, 67.11, 67.13, 435.3, 455/436–444, 343.1–343.5; 370/281, 280
See application file for complete search history.

(56) References Cited

U.S. PATENT DOCUMENTS

| | | | |
|---|---|---|---|
| 6,023,622 | A | 2/2000 | Plaschke et al. |
| 6,094,421 | A * | 7/2000 | Scott ........................... 370/280 |
| 6,122,270 | A | 9/2000 | Whinnett et al. |
| 6,618,365 | B1 * | 9/2003 | Vannatta et al. ............. 370/333 |
| 6,650,905 | B1 * | 11/2003 | Toskala et al. .............. 455/522 |
| 6,810,019 | B2 * | 10/2004 | Steudle ........................ 370/252 |
| 2002/0169008 | A1 * | 11/2002 | Hiben et al. ................. 455/574 |
| 2002/0187784 | A1 * | 12/2002 | Tigerstedt et al. ........... 455/439 |

FOREIGN PATENT DOCUMENTS

| | | |
|---|---|---|
| EP | 0 996 301 A1 | 4/2000 |
| WO | WO 94/29981 A1 | 12/1994 |
| WO | WO 01/58197 A1 | 8/2001 |

OTHER PUBLICATIONS

M. Gustafsson et al., "Compressed Mode Techniques for Inter-Frequency Measurements in a Wide-band DS-CDMA System", vol. 1, Sep. 1, 1997, pp. 231-235 with Abstract.
3GPP TS 25.212 V2.0.0, "$3^{RD}$ Generation Partnership Project Technical Specification Group; Radio Access Network; Working Group; Multiplexing and channel coding", Jun. 1999, pp. 32-36.

(Continued)

*Primary Examiner*—Raymond S Dean
(74) *Attorney, Agent, or Firm*—Sughrue Mion, PLLC

(57) ABSTRACT

A frequency division duplex radio access telecommunications terminal comprises a transmitter for transmitting a transmission signal at a first frequency. The transmitter is arranged to switch between a peak power mode in which the transmission signal is transmitted at a peak power level, and a reduced power mode. A receiver receives a reception signal at a second frequency different from the first frequency. A detector measures the signal strength of the reception signal. A controller is arranged to cause the detector to measure the signal strength of the reception signal whilst the transmitter is operating in the reduced power mode, and at a predetermined time before the transmitter switches to the peak power mode.

14 Claims, 6 Drawing Sheets

OTHER PUBLICATIONS

3GPP TS 25.215 V0.3.0, "$3^{rd}$ Generation Partnership Project; Technical Specification Group Radio Access Network; Physical layer—Measurements", Mar. 2002, pp. 14-16.

3GPP TS 25.231 V0.3.0, "$3^{rd}$ Generation Partnership Project; Technical Specification Group; Radio Access Network; Working Group; Physical layer—Measurements", Jun. 1999, pp. 1-27.

* cited by examiner

MEASUREMENT TECHNIQUE FOR A RADIO ACCESS TELECOMMUNICATIONS TERMINAL

FIELD OF INVENTION

The present invention relates to the field of frequency division duplex radio access telecommunication terminals and in particular to the measurement of the received signal strength of frequency channels within a transmission gap.

BACKGROUND OF INVENTION

In the Universal Mobile Telecommunications Standard (UMTS) air interface, a base station communicates with User Equipment (UE) continuously. Therefore, unlike the Global System of Mobile communications (GSM) standard, there is no discrete time slot allowed for the UE to measure the strength of other frequency channels. However, the UMTS standard has defined periods in this continuous transmission where the transmitter and receiver within the UE are "powered down". These gaps are defined as the compressed mode, and as such the UE has the opportunity of making measurements of the received signal strength on other frequency channels. It the received signal strength on a different channel is stronger, the UE changes channel as commanded by the network's Radio Resource Management (RRM) that is in control of the Radio Link This improves the quality of service to the UE. Additionally, this allows the UE to roam between broadcast cells.

During the compressed mode, the transmission of signals from the UE can be halted so as to reduce interference on the received channels that are being measured.

In a dual mode UE, both the UMTS standard and the GSM standard are supported. This means, during compressed mode, measurement of both the UMTS standard and the GSM standard received signals can be performed.

Accordingly, during compressed mode, the GSM measurement receiver switches on to begin taking the measurements of the other frequency channels. However, this means that if the UE switches the GSM measurement receiver on too early, i.e. before the UMTS transmitter is "powered down", the GSM receiver may cause internal interference on the UMTS signal that is being transmitted, and therefore repeated data transmission may be required. Accordingly, this increases power consumption.

Additionally, if the measurements made by the GSM measurement receiver are carried out at the start of the compressed mode gap, if the UMTS transmitter is not fully powered down, interference can occur on the GSM measured signal, and therefore repeated measurements of the GSM signal may be required. This again increases power consumption within the UE.

It is therefore an object of the present invention to address these problems.

SUMMARY OF THE PRESENT INVENTION

The present invention reduces the power consumed in a dual mode user equipment (UE) terminal by reducing the amounts of interference on a measured down link signal. By reducing the interference, the number of remeasurements of down link channels and retransmission of data is reduced and consequently the amount of power consumed by the UE is also reduced, therefore increasing battery life.

To reduce interference, the present invention determines when, during a reduced power level of the transmitter, to begin measuring the signal strength of the down link channels of the second signal type.

Specifically, then a first aspect of the present invention, there is provided a frequency division duplex radio access telecommunications terminal for transmission of a first signal type having a peak power level and a periodic reduced power level, and for reception of a second signal type different to the first signal type, the terminal comprising a transmitter for transmitting a transmission signal of the first type at a first frequency, the transmitter being arranged to switch between a peak power mode in which the transmission signal is transmitted at a peak power level, and a reduced power mode; a receiver for receiving a reception signal of the second type and at a second frequency, different from the first frequency of the transmission signal; a detector for measuring the signal strength of the reception signal; and a controller in communication with the receiver, transmitter and detector, the controller being arranged to cause the detector to measure the signal strength of the reception signal whilst the transmitter is operating in—the reduced power mode, and at a predetermined time before the transmitter switches to the power mode.

According to a second aspect of the present invention, there is provided a method of measuring the strength of a received radio signal in a mobile telecommunications terminal, the method comprising the steps of transmitting, at a first frequency, a transmission signal of a first signal type, the first signal type having a peak power level and a periodic reduced power level; switching the transmission signal between a peak power mode at a peak power level and a reduced power mode; receiving at a second frequency, different from the first frequency of the transmission signal, a reception signal of a second type, different to the first signal type; and measuring the signal strength of the reception signal whilst the transmission signal is in the reduced power mode, and at a predetermined time before the transmission signal is switched to the peak power level.

Additionally, the amount of interference on the second type down link signal being measured is further reduced by ordering the sequence in which the down link signals are measured, with the most interfering signals being ordered so that measurement of these occurs at a point during a reduced power mode of the UE transmitter, furthest from the peak power level of the UE transmitter.

According to a further aspect of the present invention, there is provided a frequency division duplex radio access telecommunications terminal for transmission of a first signal type having a peak power level and a periodic reduced power level, and for reception of a second signal type different to the first signal type, the terminal comprising a transmitter for transmitting a transmission signal of the first type at a first frequency, the transmitter being arranged to switch between a peak power mode in which the transmission signal is transmitted at a peak power level, and a reduced power mode; a receiver for receiving a plurality of reception signals of the second type, each reception signal being at one of a further plurality of frequencies, different from the first frequency of the transmission signal; a detector for measuring the signal strength of the reception signals; and a controller in communication with the receiver, transmitter and detector, the controller being arranged to determine the order in which the detector measures each of the reception signals, based upon the degree of interference, in each case, between the transmission signal and the plurality of reception signals whose strength is to be measured.

According to a fourth aspect, there is provided a method for ordering the measurement of the strength of a received radio signal in a mobile telecommunications terminal, the method comprising the step of transmitting at a first frequency, a transmission signal of a first signal type, the first signal type having a peak power level and a periodic reduced power level; switching the transmission signal between a peak power mode at a peak power level at a reduced power mode; receiving a plurality of reception signals, each reception signal being at one of a further plurality of frequencies, different from the first signal type, at a second frequency, different to the frequency of the transmission signal; and determining the order in which each of the reception signals are measured, based upon the degree of interference, in each case, between the transmission signal and the plurality of reception signals whose strength is to be measured.

BRIEF DESCRIPTION OF THE DRAWINGS

A specific embodiment will now be described, by way of example only and with reference to the following drawings in which.

SPECIFIC DESCRIPTION OF THE PREFERRED EMBODIMENT OF THE PRESENT INVENTION

Figure 1:
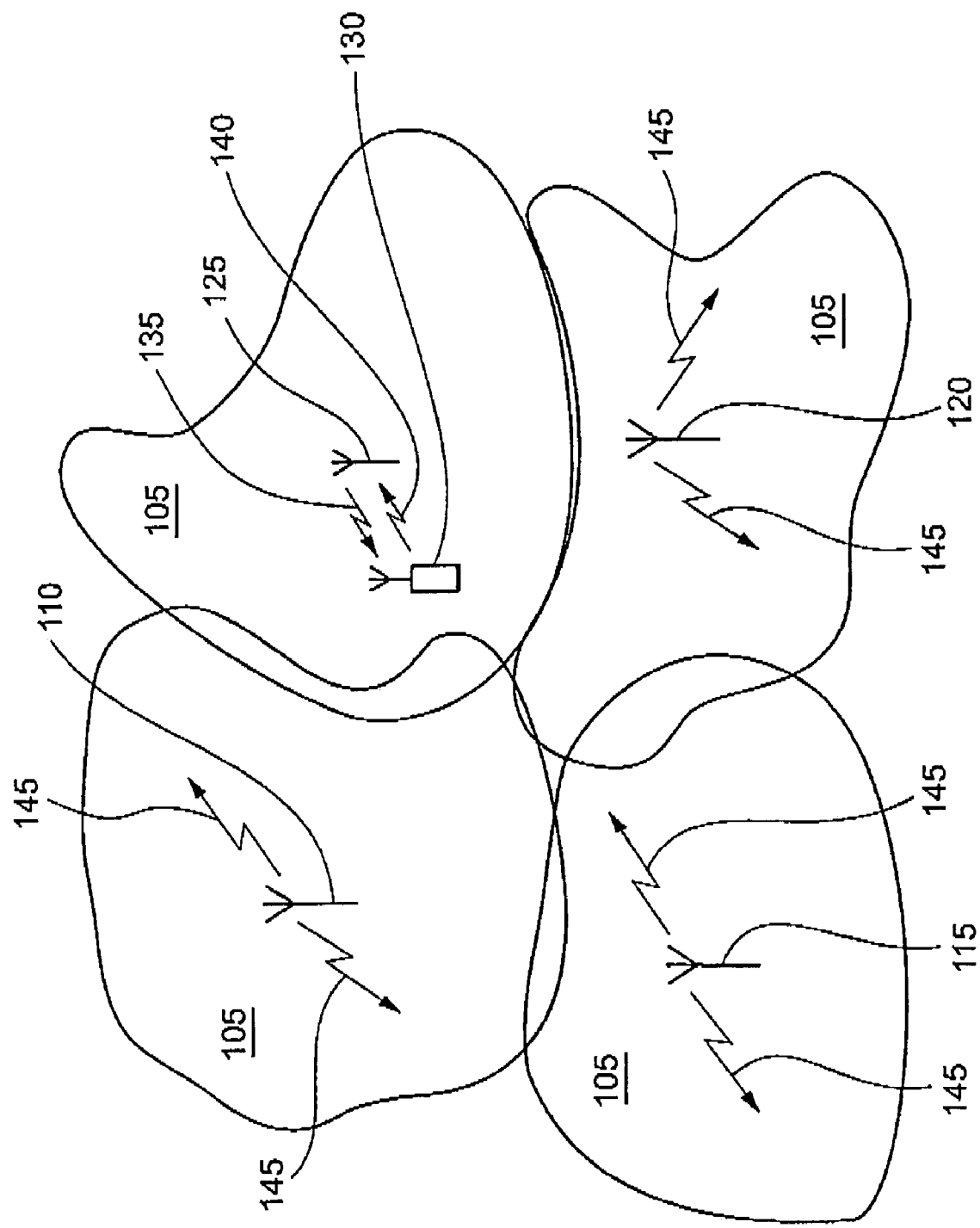
FIG. 1 shows a schematic view of four broadcast cells in which user equipment (UE) communicates with a respective base station.

FIG. 1 shows a perspective view of four communication cells 105. Each of the communication cells 105 is generated by a first, second, third and fourth base station 110, 115, 120, 125 respectively. The cells 105 define an area, in which user equipment (UE) can communicate with one of the appropriate base stations 110, 115, 120, 125. In FIG. 1, a UE 130 is in communication with the fourth base station 125. Clearly, although only a single UE 130 is shown communicating with the fourth base station 140, it is understood that in reality, the fourth base station may be in communication with several UEs 130. The UE 130 generates an "up link" signal 140 which is transmitted to and received by the fourth base station 125. The fourth base station 125 communicates with the UE 130 by generating a "down link" signal 135 which is received, and processed, by the UE 130. It should be noted that in this embodiment, the mobile station is capable of generating the up link signal in accordance with one of two telecommunications standard. Preferably, one standard is the Global System, for Mobile communication (GSM) and the other standard is the Universal Mobile Telecommunications Standard (UMTS). As will be appreciated though, the present invention is not limited to the GSM and UMTS standard, and other standards such as CDMA-2000, EGSM and the like may be used instead.

Additionally, it is to be appreciated that the frequency of the up link and down link signals will be operating at different frequencies.

As is known, the UE 130 may roam between the different communication cells, and will therefore be capable of communicating with either the first, second or third base stations 110, 115, 120. As the UE 130 moves around the present cell or into another cell 105, down link signals 135, 145 generated by either the first, second, third or fourth base stations 110, 115, 120, 125 are received by the UE 130. As these down link signals are transmitted on different frequency channels, the UE 130 must scan other frequency channels to determine which channel is most appropriate to continue communicating with the base station on. The UE determines this, from amongst other things, the strength of the received signal. This means that the UE 130 has to scan other down link signals on different frequencies from that with which it is currently receiving. This scanning procedure is known in the art. In the present case however, this frequency scanning takes place during the compressed mode of the UMTS standard.

Figure 2A:
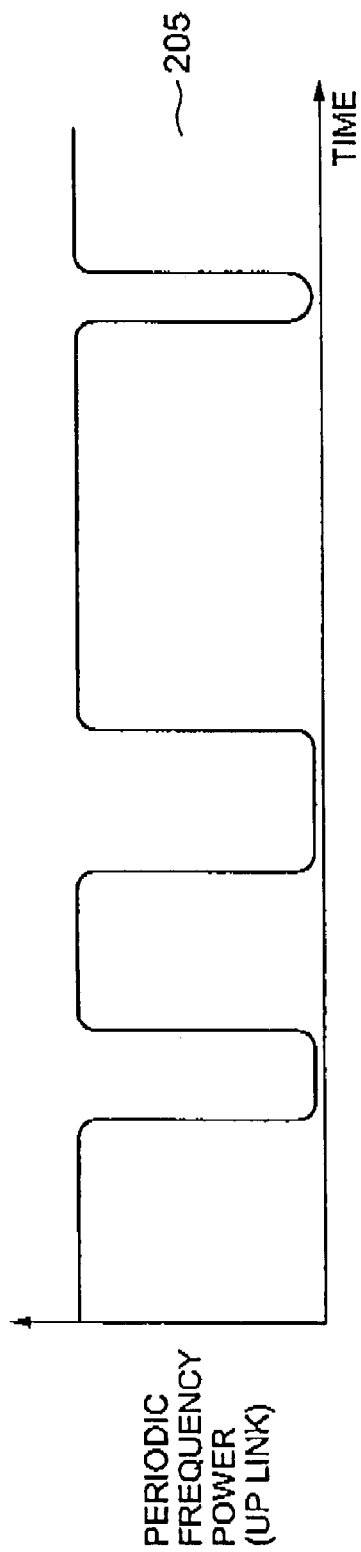
FIGS. 2A and 2B show a typical Universal Mobile Telecommunication Standard (UMTS) periodic signal pattern which is transmitted on an up link and down link channel respectively.
Figure 2B:
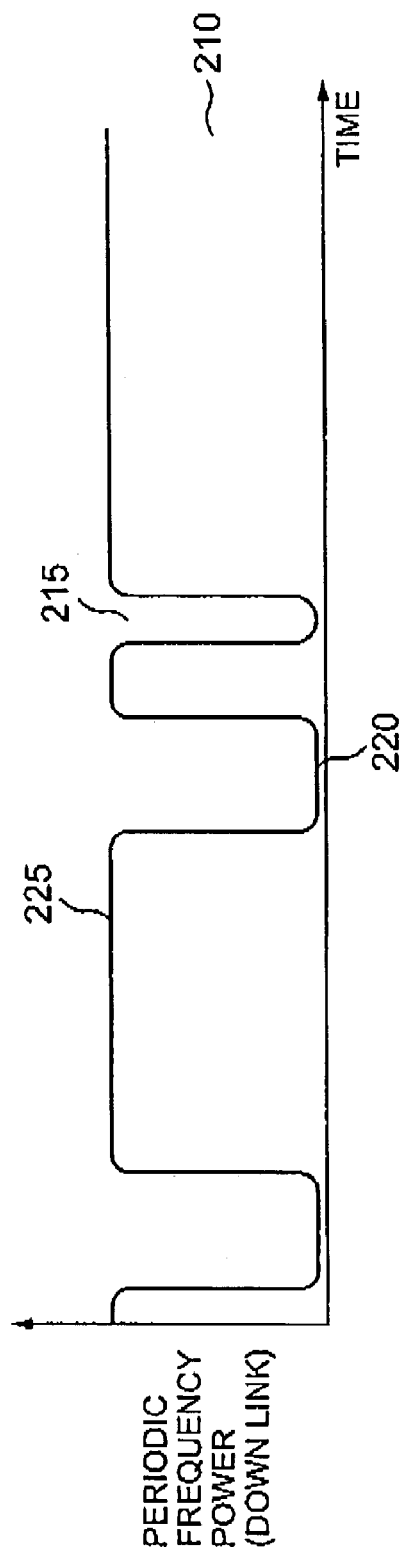

FIG. 2 shows a typical UMTS periodic signal pattern that is associated with the up link 205 and down link channels 210. As noted previously, the up link 205 and the down link channels 210 are transmitted on different frequencies. Each period in the UMTS signal pattern is composed of a length of time during which peak power transmission occurs 225 and a length of time in which the transmitted power of the up link and down link signals are a minimum 220. This minimum transmission period is called compressed mode 215. The time gap in UTRAN WCDMA compressed mode can vary from 3 to 14 timeslots over one or two 10 mS frames. Higher layer parameters are transmitted by the network that indicate the position and period of the compressed mode in the FDD frame structure.

Compressed mode is a known feature of the UMTS standard. During compressed mode, the output from the UMTS transmitter is turned off in the UE and for the base station (node B) the transmitted signal to the specific UE is turned off (not the RF transmitter serving other UEs). The WCODMA system allows for simultaneous and non-simultaneous Uplink and Downlink compressed mode.

This, in a single mode UMTS UE, allows a UMTS measuring receiver to measure the strength of the down link signals at different frequencies. From these measurements, the UE 130 determines whether to change communication channels. It should be noted that the UE 130 receives, from the base station with which it is communicating, details of the sequence of the compressed mode pattern. In other words, as the UE 130 is first switched on or has changed operating channels, the UE 130 needs details of the new compressed mode sequence for the up link and down link channels upon which it is now communicating. This sequence information is transmitted to the UE 130 by the base station.

Because the GSM standard signals are time duplexed, there are prescribed times during which the GSM transmitter does not operate, and hence the GSM measurement receiver can measure other GSM down link channels. More specifically, in GSM there are eight time slots in each GSM uplink and downlink frame. The UE is allocated one of the eight slots for its uplink in the uplink frame and one slot for its downlink in the downlink frame. These two slots are allocated so that each UE is allocated an uplink time slot that is three slots after it receives any information from the allocated downlink time slot. Therefore the UE has two time slots idle from the moment it receives a command from downlink or four idle slots after its uplink transmission to the network for measurement. In GSM these idle slots can be used for system measurements similar to that created by compressed mode in UTRAN.

Figure 3:
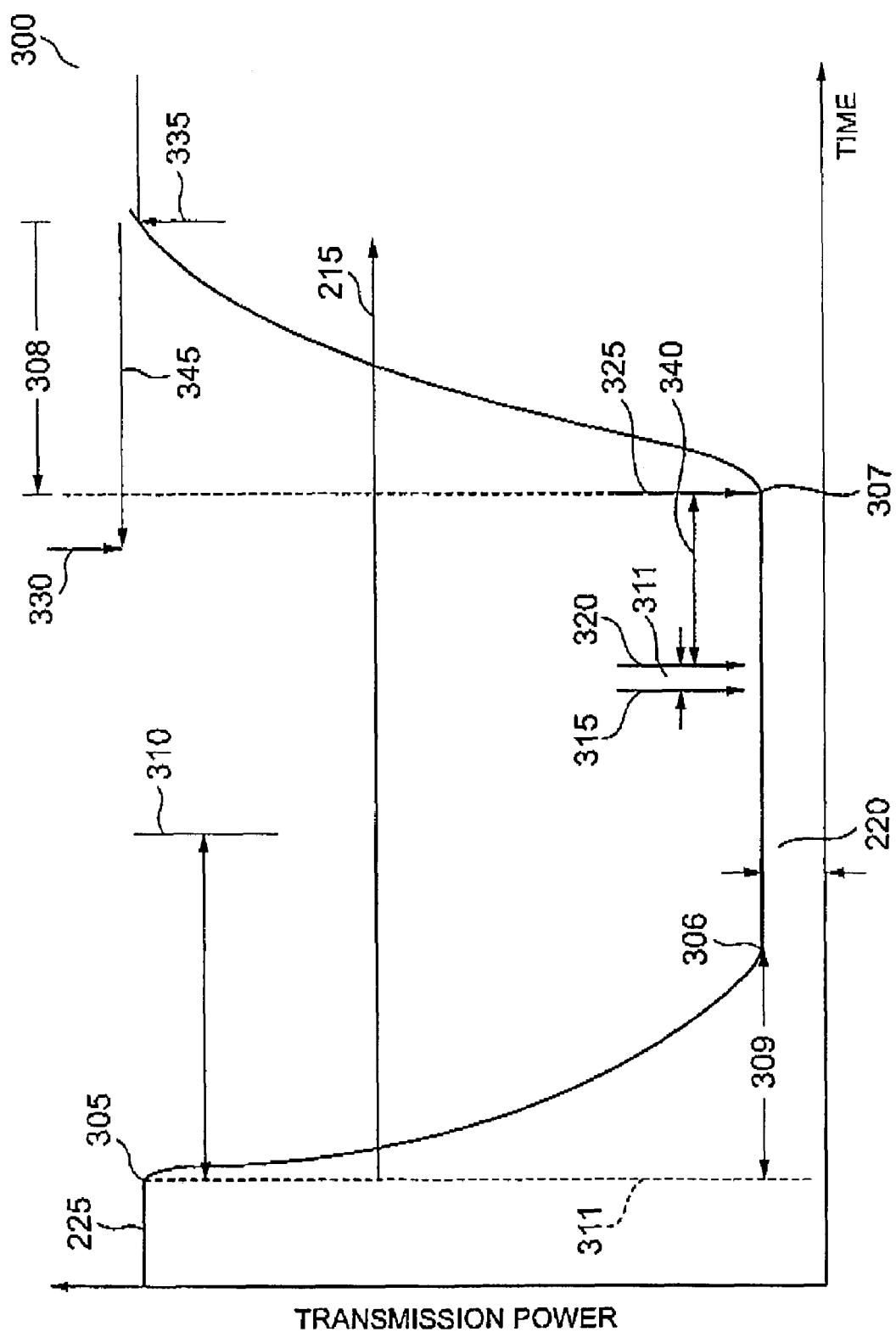
FIG. 3 shows a more detailed timing diagram of the compressed mode transmission frame, illustrating an aspect of the present invention.

FIG. 3 shows a detailed timing diagram 300 of the compressed mode transmission gap 215. As can be seen, during the time indicated at 225, a UMTS transceiver (not shown) is powered on. At the ramp down point 305 however, the UE 130 begins to enter compressed mode. Ideally, the UMTS transceiver power would fall in accordance with the dashed line 311. However, due to the parasitic characteristics of the UMTS transceiver, in particular the capacitance, the UE 130 enters the compressed mode at a second point depicted in FIG. 3 at 306, which is a ramp down time (defined by line 309 in FIG. 3) later. Similarly, the UE 130 is powered at ramp up point 307 as it begins to leave compressed mode. Ideally, the transceiver would resume full power in accordance with the dashed lines 325. However, due to the parasitic characteristics of the transceiver, as noted previously, the full power of transceiver does not begin (and therefore the UE 130 does not leave compressed mode) until point 335. This is a ramp up time (shown by line 308 in FIG. 3) later. The nature of the parasitic characteristics of the UMTS transceiver determines the ramp up and ramp down time, but this time can typically be 0.5 mS to rise and 0.5 mS to fall. This means, therefore, that there is a time gap of the order of 1 ms between the point 306 and 307 when the UE 130 is operating in compressed mode while the transceiver is ramping up or down. It should be noted that 15 time slot in FDD WCDMA is 10 mS.

Figure 4:
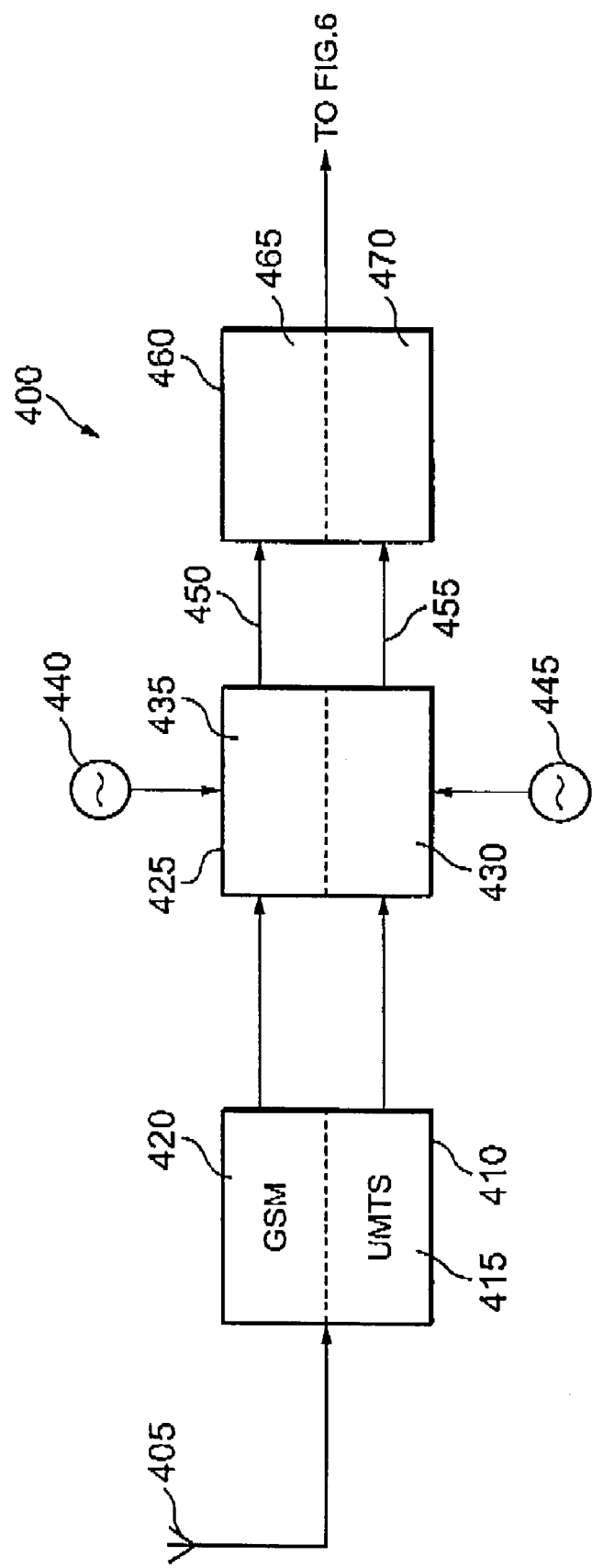
FIG. 4 shows a block diagram of a receiver section of a radio access telecommunications terminal of the present invention suitable for implementation of measurements upon the timing diagram of FIG. 3.

FIG. 4 shows a block diagram of a receiver section of a radio access telecommunications terminal 400. An antenna 405 is connected to a receiver block 410. The antenna 405 is arranged to receive signals using both the GSM and UMTS standards as is understood. The receiver block 410 consists of a UMTS receiver 415 and a GSM receiver 420 (detector). Both the UMTS receiver 415 and the GSM receiver 420 are arranged to receive signals according to the appropriate standard. The UMTS receiver 415 and the GSM receiver 420 are attached to a down converter block 425. The down converter block 425 consists of a GSM down converter 435 and a UMTS down converter 430. Also input to the down converter 425 is a first and second frequency synthesizer 440 and 445. The first frequency synthesizer 440 is connected to the GSM down converter 435 and the second frequency synthesizer 445 is connected to the UMTS down converter 430. Although the first and second frequency synthesizers 440, 445 are shown separately, it is anticipated that they may be incorporated into a single frequency synthesizer. The frequency of the signal generated by the first and second frequency synthesizers 440, 445 is such that the output of the GSM and UMTS down converters 435, 430 are of a constant intermediate frequency. In other words, as the frequency of the chosen down link channel changes, the frequency of the signal generated by the first and second frequency generators 440, 445 changes so that the output of the GSM down converter 435 and the UMTS down converter 430 are at a constant, intermediate, frequency 450, 455. A base band processor 460 comprises a GSM base band processor 465 and a UMTS base band processor 470.

GSM intermediate frequency 450 is fed into the GSM base band processor 465 and the UMTS intermediate frequency 455 is fed into the UMTS base band processor 470. The GSM and UMTS base band processors 465, 470 further down convert the intermediate frequency signal into a base band signal and also digitize the down converted signals for further processing by a processor. The processor is described, later, in relation to FIG. 6.

The functionality of the receiver section of the UE 130 in the implementation of an embodiment of the present invention will now be described with reference to FIG. 3.

As mentioned previously, whilst the UMTS transmitter is transmitting at peak power 225, the GS1X measuring receiver 420 does not measure the signal strength of other down link frequency channels. This is because the UMTS internal circuitry will produce interference on the GSM receiver circuitry, and so may produce spurious signal measurements. In these circumstances, remeasurement or data retransmission would be required which reduces the battery life of the user equipment. Accordingly, the measurement of the UMTS and GSM down link channels are made within the time period defined between point 306 and 307 as depicted in FIG. 3.

Figure 6:
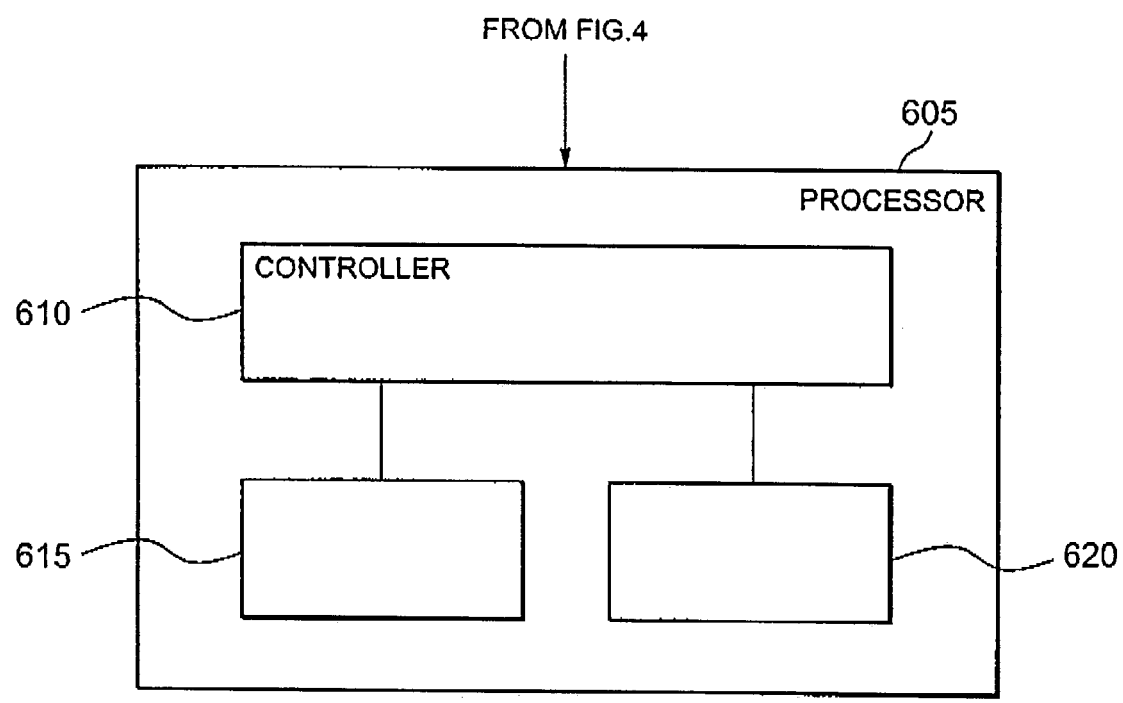
FIG. 6 shows a processor for implementation of the embodiments of FIGS. 3, 4 and 5.

A processor 605, as shown in FIG. 6, is connected to each of the UMTS transmitter (not shown), the UMTS receiver 415, the GSM receiver 420 and the first and second frequency synthesizers 440, 445. Accordingly, the processor controls the operation of at least the above components in the UE 130.

The processor 605 contains a controller 610, a logical layer 1 and protocol stack 615 and a memory store 620. The protocol stack and logical layer 1 615 are programming functions that sequences commands to the controller 610 and is aware of the timing and manages the order of the measuring sequence, as would be appreciated by the skilled person.

The protocol stack and logical layer 1 615 is connected to the controller 610. The controller is arranged to process the received digital signals as well as generate digital signals for transmission. The memory store 620 is connected to the controller 610 and is arranged to store, amongst other things, the details regarding the measurement times that are associated with the GSM receiver 420. The evaluation of the length of time that the GSM measurement receiver 420 takes to measure the different down link channels will now be described.

The GSM receiver 420 is arranged to evaluate the time period that is required for it to make the signal strength measurements of other frequency GSM down link channels. There are a number of ways this may be achieved. As an example, during the test procedure at the point of manufacture, the GSM receiver 420 may be required to measure the strength of a particular GSM down link frequency channel. During this time, the GSM receiver may count the number of clock pulses, supplied by a clock, for example the processor clock, that is required to enable the GSM receiver 420 to measure the signal strength of the particular frequency channel. The number of clock pulses that is required will then be stored in the memory store 620 which is either contained within or is accessible to the processor. Additionally, the processor 605 can be further arranged periodically to check and update the stored value it necessary. This periodic updating has the advantage that as the components deteriorate over time, any alteration in the time that the GSM receiver 420 takes to make the signal strength measurements may be kept accurate.

The processor 605 now determines the time in which the GSM receiver 420 has to begin scanning the other down link frequency channels. To ensure that the GSM measuring receiver 420 ceases measuring as the UE 130 begins to leave compressed mode (at the ramp up point 307), and so mitigate the problem of interference, it is preferable that the GSM receiver 420 ceases measuring at the ramp up point 307. Therefore, the processor defines the latest time that the GSM measuring receiver can begin measuring This time is defined by $$\text{Latest time for measuring} = \begin{array}{c}\text{Time of } UE \text{ 130 to begin}\\ \text{leaving compressed mode}\\ \text{(ramp up point 307)}\end{array} - \begin{array}{c}GSM \text{ Receiver}\\ \text{measurement}\\ \text{period}\end{array} \quad (1)$$

It is preferable to determine the latest time for the GSM measuring receiver 420 to begin measuring the different frequency down link channels in relation to the ramp up point 307 because the processor 605 controls when the UE 130 begins to leave compressed mode. Therefore, this ramp up point 307 is precisely defined by the processor 605. However, it is anticipated that if the minimum power point 306 is well defined, for example if the ramp down time 309 is measured during manufacture and stored in the memory store 620, then the latest time for the GSM measuring receiver 420 to begin measuring can be determined in relation to either the minimum power point 306 or the ramp down point 305.

As noted earlier, the GSM receiver 420 is inoperative whilst the UMTS transmitter is transmitting uplink signals or the UMTS receiver is receiving downlink signals and, as such, the GSM receiver enters a standby mode. Therefore, there is a delay present in preparing the GSM receiver 420 to make the signal strength measurements. This is depicted in FIG. 3 by the receiver warm up time shown as line 311. Accordingly, the processor will need to calculate the latest activation time for the GSM receiver 420 to accommodate the preparation time. The latest activation time can therefore be defined as $$\begin{array}{c}\text{Latest activation}\\ \text{time}\\ \text{(line 315)}\end{array} = \begin{array}{c}\text{Time of } UE \text{ to}\\ \text{begin}\\ \text{leaving}\\ \text{compressed mode}\\ \text{(ramp up point 307)}\end{array} - \begin{array}{c}\text{Receiver}\\ \text{measurement}\\ \text{period}\\ \text{(line 340)}\end{array} - \begin{array}{c}\text{Receiver}\\ \text{Preparation}\\ \text{Time}\\ \text{(line 311)}\end{array}$$

The time taken for preparing the GSM receiver 420 is evaluated in a similar manner to that as described above in relation to the receiver measurement period (line 340). The preparation time value is also stored in the memory store so that the processor may access the information.

It should be noted that, although this embodiment is being described specifically with relation to GSM receivers, it is anticipated that UMTS terrestrial radio access (UTRA), Enhanced GSM (EGSM), Personal Communications System (PCS), Code Division Multiple Access-2000 (CDMA-2000) and the like may conduct measurements during the compressed mode in a similar manner to that described above.

Furthermore, it should be noted that the measurement for a particular frequency channel may be conducted over one or more compressed mode time periods. For example, if the period required for measuring the GSM receiver signal is longer than the maximum period offered by the compressed mode as set by the network, the UE 130 is scheduled for the measurements to be conducted across several compressed mode gaps.

Figure 5:
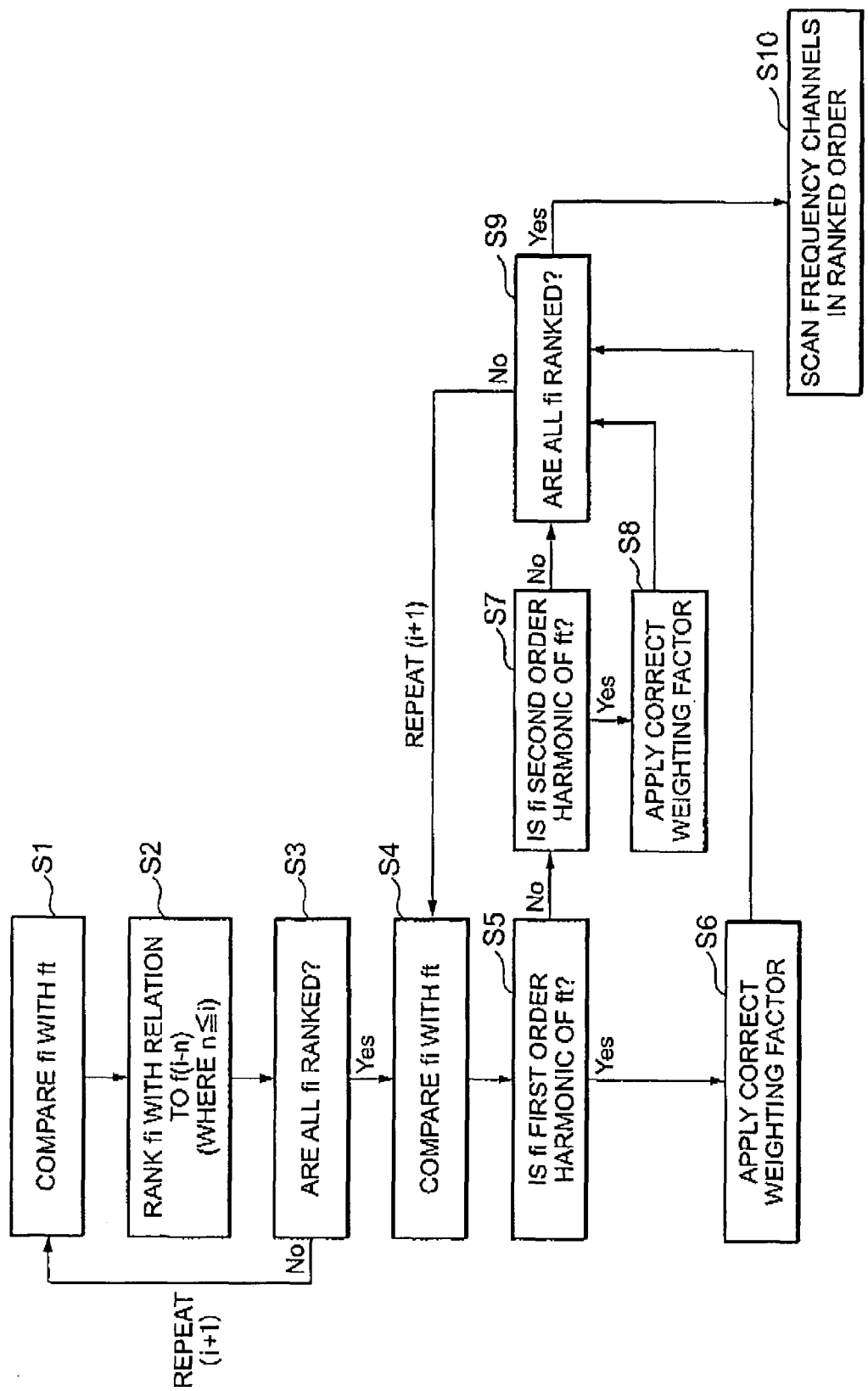
FIG. 5 shows a flow diagram for determining the preferred order in which Global System Mobile communication (GSM) frequency channels are scanned, and embodying a second aspect of the present invention.

The order in which the channels are preferably scanned according to another feature of the invention will now be described by way of example and with reference to FIG. 5. As noted earlier, the UMTS and GSM receivers 415, 420 scan through other down link frequency channels that are different to the down link channel with which the UE 130 is communicating with the base station. Although the GSM receiver 420 is arranged to scan the down link channels during compressed mode, thus reducing the amount of interference on the measured signal, the level of interference is determined to a large extent by the frequency of the up link signal transmitted by the UE 130 and the frequency of the down link signal being measured. For example, an up link channel that is closer in frequency to the down link channel being measured produces a higher level of interference compared with an up link channel that has a frequency of operation that is as close. Additionally, an up link frequency channel that has a frequency of operation that is a harmonic of the down link channel being measured also produces a high level of interference. The processor 605 is thus also configured further to reduce the level of interference by measuring the signal strength of the down link channels in a particular order during the compressed mode state. The ordering will be conducted by the processor 605 in accordance with FIG. 5 that shows a flow diagram, used by the processor 605, for determining the preferred order in which to scan the frequency channels.

The processor 605 contains a controller 610, a logical layer 1 and protocol stack 615 and a memory store 620. The protocol stack and logical layer 1 615 are programming functions that sequences command to the controller 610 and is aware of the timing and manages the order of the measuring sequence, as would be appreciated by the skilled person. The protocol stack and logical layer 1 615 is connected to the controller 610. The controller is arranged to process the received digital signals as well as generate digital signals for transmission. The memory store 620 is connected to the controller 610 and is arranged to store, amongst other things, the details regarding the measurement times that are associated with the GSM receiver 420.

As an example of the order in which the GSM receiver 420 measures the down link channels, if there are four down link channels each of which are at a frequency $f_1$, $f_2$, $f_3$, $f_4$, to be scanned during the compressed mode period, the logical layer 1 and protocol stack 615 is notified by the controller 610 that the GSM receiver 420 is to begin measuring the signal strength of the four channels. This notification will happen at a time defined by line 315 as shown in FIG. 3. The logical layer 1 and protocol stack 615 has a list of the four channels that are to be scanned. This list is provided as the user equipment moves into a communication cell and begins communicating with a particular base station. In reality, the logical layer 1 and protocol stack 615 stores this list as a set of numbers known in the art as absolute radio frequency channel numbers (ARFCN). Each of these numbers has associated characteristics, for example, the frequency of the carrier of the channel. The logical layer 1 and protocol stack 615 provides the controller 610 with the detail, and order, of the frequency channels that are to be scanned by the GSM receiver 420.

It is anticipated that the amount of interference caused by any particular channel, on any other channel, will be determined and programmed into the logical layer 1 and protocol stack 615 during manufacture.

In this example, the uplink channel is operating at 900 MHz, $f_1$ is operating at 2500 MHz, $f_2$ is operating at 1800 MHz, $f_3$ is operating at 2100 MHz and $f_4$ is operating at 800 MHz.

Accordingly, the protocol stack and logical layer 1 615 evaluates the channels $f_1$, $f_2$, $f_3$, $f_4$, in sequence.

Preferably, the protocol stack and logical layer 1 615 then ranks the channels by comparing the frequency of the scanned channel (fi) with the frequency of the uplink channel (ft) (step S1). The ranking is conducted such that the scanned channel which is deemed to interfere most with the uplink channel is ranked highest and is measured nearest to point 307. Accordingly, the rank attributed to each of the channels is $f_1=1$, $f_2=3$, $f_3=2$ and $f_4=4$ in this exemplary example. Therefore, as $f_4$ operates at a frequency closest to the uplink channel, it is ranked as number 4 such that it is scanned nearest the ramp up point 307. Also, as $f_1$ is ranked 1 (and is therefore the least interfering channel), it is scanned nearest to point 306 (step S2).

However, as a channel having a frequency of operation that is a harmonic of the uplink channel increases interference, the protocol stack and logical layer 1 615 may incorporate, into the ranking, a weighting factor. In this example, the weighting factor for a first order harmonic is a multiplier of 2. Therefore although $f_2$ previously was ranked number 3, with the weighting factor applied, $f_2$ is ranked number 6 (steps S5, S6). As there are only four possible channels to be scanned, $f_2$ will be scanned nearest point 307.

Clearly, other weighting factors may be incorporated. For example, a channel having a frequency of operation that is a second order harmonic of the uplink channel will increase interference (although the interference will not be as severe as is the case with a first order harmonic). Therefore, a weighting factor of 1.5 may be applied to the ranking in this case (steps S7, S8). Additionally, if the ranking were reversed, such that a ranking of 1 is attributed to the most interfering signal, then the weighting factor would be a divisor.

It will be apparent to the skilled person that by measuring the most interfering channels at a point furthest away from the ramp down transition edges of the UMTS transmitter, the interference between the GSM receiver and the UMTS transmitter will be further reduced.

Although this invention has been described with reference to a dual mode UE, it will be appreciated that any single mode UE that communicates using different frequency up link and down link channels and operating using different telecommunication standards as well as a telecommunications standard incorporating compressed mode operation, such as UTRA-FDD, can use the present invention.

The invention claimed is:

1. A frequency division duplex radio access telecommunications terminal for transmission of a first signal type having a peak power level and a periodic reduced power level, and for reception of a second signal type different from the first signal type, the terminal comprising:
   a transmitter for transmitting a transmission signal of said first type at a first frequency, the transmitter being arranged to switch between a peak power mode in which the transmission signal is transmitted at a peak power level, and a reduced power mode;
   a receiver for receiving a plurality of reception signals of said second type, each reception signal being at one of a further plurality of frequencies, different from said first frequency of the transmission signal;
   a detector for measuring the signal strength of said reception signals; and
   a controller in communication with the receiver, transmitter and detector, the controller being arranged to determine the order in which said detector measures each of said reception signals, based upon the degree of interference, in each case, between the transmission signal and the plurality of reception signals whose strength is to be measured.

2. A terminal as claimed in claim 1, wherein the controller is further arranged to order the measurement of the reception signals, whilst said transmitter is in the reduced power mode, such that the measurement of that reception signal with the most degree of interference with said transmission signal is the last to take place before said transmitter switches to said peak power mode.

3. A terminal as claimed in claim 1, wherein said degree of interference is determined in accordance with at least one frequency characteristic of each of said reception signals relative to said first frequency of said transmission signal.

4. A terminal as claimed in claim 3, wherein said frequency characteristic is the difference in frequency between each of said reception signals and said first frequency of said transmission signal.

5. A terminal as claimed in claim 2, wherein said frequency characteristic is the harmonic signal content of said each of said reception signals relative to said transmission signal.

6. A terminal as claimed in claim 3, wherein said frequency characteristic is determined by further including a weighting factor, the value of the weighting factor being determined by the harmonic content of said each of said reception signals compared with said transmission signal.

7. A method for ordering the measurement of the strength of a received radio signal in a mobile telecommunications terminal, the method comprising the step of:
   transmitting at a first frequency, a transmission signal of a first signal type, the first signal type having a peak power level and a periodic reduced power level;
   switching the transmission signal between a peak power mode at a peak power level and a reduced power mode;
   receiving a plurality of reception signals, each reception signal being at one of a further plurality of frequencies, different from the first signal type, at a second frequency, different from said frequency of said transmission signal; and
   determining the order in which each of the reception signals are measured, based upon the degree of interference, in each case, between the transmission signal and the plurality of reception signals whose strength is to be measured.

8. A method as claimed in claim 7, wherein the order of the measurement of each of the reception signals, whilst said transmitter is in the reduced power mode, is such that reception signal with the most degree of interference with said transmission signal is last to take place before said transmitter switches to peak power mode.

9. A method as claimed in claim 7, wherein said degree of interference is determined in accordance with at least one frequency characteristic of each of said reception signals relative to said first frequency of said transmission signal.

10. A method as claimed in claim 9, wherein said frequency characteristic is the difference in frequency between each of said reception signals and said first frequency of said transmission signal.

11. A method as claimed in claim 9, wherein said frequency characteristic is the harmonic signal content of said each of said reception signals compared with said transmission signal.

12. A method as claimed in claim 10, wherein said frequency characteristic is determined by further including a weighting factor, the value of the weighting factor being determined by the harmonic content of said each of said reception signals compared with said transmission signal.

13. A computer-readable storage medium storing a computer program having portions of program code which, when executed, cause a processor to control the steps of the method as claimed in claim 7.

14. A telecommunication system comprising:
   a terminal as claimed in claim 1; and a base station including a base station transmitter and a base station receiver, wherein said transmitter is arranged to communicate with said terminal using said first signal type and further wherein said receiver is arranged to receive signals from said terminal in accordance with said second signal type.

* * * * *